(12) United States Patent
Gong et al.

(10) Patent No.: US 9,356,528 B2
(45) Date of Patent: May 31, 2016

(54) SWITCHING CONVERTER AND AC ADAPTER USING THE SAME

(71) Applicant: Samsung Electro-Mechanics Co., Ltd., Gyeonggi-do (KR)

(72) Inventors: Jung Chul Gong, Gyeonggi-do (KR); Jong Rok Kim, Gyeonggi-do (KR); Hwan Cho, Gyeonggi-do (KR)

(73) Assignee: SOLUM CO., LTD., Suwon-Si (KR)

( * ) Notice: Subject to any disclaimer, the term of this patent is extended or adjusted under 35 U.S.C. 154(b) by 156 days.

(21) Appl. No.: 13/956,298

(22) Filed: Jul. 31, 2013

(65) Prior Publication Data

US 2014/0211517 A1    Jul. 31, 2014

(30) Foreign Application Priority Data

Jan. 25, 2013    (KR) .................. 10-2013-0008535

(51) Int. Cl.
*H02M 3/335* (2006.01)

(52) U.S. Cl.
CPC ........ *H02M 3/33592* (2013.01); *Y02B 70/1475* (2013.01)

(58) Field of Classification Search
CPC .................................................. H02M 3/33592
See application file for complete search history.

(56) References Cited

U.S. PATENT DOCUMENTS

| | | | |
|---|---|---|---|
| 6,021,059 A | 2/2000 | Kennedy | |
| 6,504,739 B2 | 1/2003 | Phadke | |
| 6,894,468 B1 * | 5/2005 | Bretz et al. | 323/274 |
| 6,980,441 B2 * | 12/2005 | Man-ho | 363/21.06 |
| 7,889,521 B2 * | 2/2011 | Hsu | 363/21.14 |
| 8,040,161 B2 * | 10/2011 | Yanagishima | H02M 1/08 327/108 |
| 2006/0013022 A1 * | 1/2006 | Jitaru | 363/21.12 |
| 2006/0171180 A1 * | 8/2006 | Kyono | 363/95 |
| 2009/0013199 A1 | 1/2009 | Leung et al. | |
| 2010/0027298 A1 * | 2/2010 | Cohen | 363/21.14 |
| 2010/0182806 A1 * | 7/2010 | Garrity et al. | 363/21.14 |
| 2010/0182807 A1 * | 7/2010 | Miyamoto et al. | 363/21.14 |
| 2014/0192565 A1 * | 7/2014 | Wang | 363/21.14 |

FOREIGN PATENT DOCUMENTS

| | | |
|---|---|---|
| JP | 10-174431 | 6/1998 |
| KR | 10-2000-0051704 A | 8/2000 |

OTHER PUBLICATIONS

KR 10-2013-0008535 Office Action dated Jan. 6, 2014; 5pgs.

(Continued)

*Primary Examiner* — Emily P Pham
(74) *Attorney, Agent, or Firm* — Bracewell LLP; Brad Y. Chin

(57) ABSTRACT

Disclosed herein is a switching converter capable of preventing a period in which a switch SW of a primary side is turned on and a period in which a synchronous rectifying switch SR SW of a secondary side is turned on from being overlapped with each other. The switching converter includes: a transformer T inducing primary energy to secondary side; a switch SW connected to a primary coil of the transformer T to switch a primary voltage; a synchronous rectifier SR connected to a secondary coil of the transformer T to rectify a secondary voltage; and a delay locked loop connected between the secondary coil and the synchronous rectifier SR, wherein the delay locked loop generates a signal synchronized with a turn-on control signal of the switch SW and outputs the generated signal to the synchronous rectifier SR to control a turn-off operation of the synchronous rectifier SR.

6 Claims, 5 Drawing Sheets

(56) References Cited

OTHER PUBLICATIONS

Jun-Young Lee; "New Single-Phase Power Factor Correction Topologues with High Efficiency and Wide Input Voltage Ranges"; Korea Advance Institute of Science and Technology; dated Oct. 27, 2000 (177 pgs.).

KR 10-2013-0008535 Notice of Allowance dated Mar. 26, 2014; 2pgs.

* cited by examiner

- PRIOR ART -

SWITCHING CONVERTER AND AC ADAPTER USING THE SAME

CROSS REFERENCE(S) TO RELATED APPLICATIONS

This application claims the benefit under 35 U.S.C. Section 119 of Korean Patent Application Serial No. 10-2013-0008535, entitled "Switching Converter and AC Adaptor Using the Same" filed on Jan. 25, 2013, which is hereby incorporated by reference in its entirety into this application.

BACKGROUND OF THE INVENTION

1. Technical Field

The present invention relates to a switching converter, and more particularly, to a switching converter using a synchronous rectifier, and an alternating current (AC) adaptor using the same.

2. Description of the Related Art

Recently, in accordance with miniaturization, lightness, and demand for improvement of performance of a laptop computer all over the world, improvement of system specifications such as building of a multimedia system, an increase in a speed of a central processing unit (CPU), an increase in a memory, and the like, has inevitably been continuously demanded.

In addition, as capacity for resources of the respective system specifications increases, even though power of 45 to 50 watts (W) has been currently used in an alternating current (AC) adaptor for the laptop computer, the demand for high capacity of 60 watts, 75 watts, and 80 watts or more, microminiaturization and slimness for portability, and high efficiency has gradually increased in the AC adaptor for the laptop computer.

Further, the reason why the efficiency of the AC adaptor should be increased is that when the efficiency is increased, internal power loss is decreased, which means that internal heat generation is low, such that the AC adaptor may be miniaturized.

However, as the most typical scheme currently used in the AC adaptor, there are a flyback circuit scheme and a resonant scheme. Here, in the case of the flyback circuit scheme, since hard switching in which crossing between a turn-off voltage Vds and a turn-on current Ids of a metal oxide semiconductor field effect transistor (MOSFET), which is a semiconductor device, is large is performed, power loss is large. Meanwhile, since the resonant scheme may decrease switching loss, it is effective for miniaturization and lightness. However, in the case of the resonant scheme, since a voltage and a current are formed in a sinusoidal wave shape, a control property is bad, and large voltage and current stresses are applied to a switching device.

Therefore, a synchronous rectifying scheme using a synchronous rectifier (SR) has been recently spotlighted due to an advantage such as high efficiency. As the synchronous rectifier, which is a rectifying apparatus obtaining a load current always flowing in a predetermined direction by vibration or a contact in synchronization with AC power, a field effect transistor (FET) having small turn-on resistance has been generally used instead of a diode in order to minimize power loss according to a turn-on operation of an output diode in a flyback circuit and increase efficiency. The FET serves to be turned on only for a period in which the diode is turned on to minimize the power loss according to the turn-on operation of the diode.

FIG. 1 is a diagram showing an example of a flyback circuit using a synchronous rectifying scheme according to the related art; and FIG. 2 is an operation waveform diagram of the flyback circuit shown in FIG. 1.

As shown in FIG. 1, the flyback circuit using a synchronous rectifying scheme according to the related art includes a transformer T inducing primary energy to secondary side, a switch SW switching a primary voltage of the transformer T, and a synchronous rectifying switch SR SW rectifying a secondary voltage of the transformer T.

The flyback circuit using a synchronous rectifying scheme according to the related art configured as described above is operated in a continuous mode (CCM) and a discontinuous mode (DCM). In the case in which the flyback circuit is operated in the continuous mode, when a gate voltage of the switch SW is controlled, a primary current Ia of the transformer T is increased in a linear function form in a period in which the switch SW is turned on. In this case, energy is accumulated in a primary coil of the transformer T in the period in which the switch SW is turned on, and a polarity of the transformer T is changed at a point in time in which the switch SW is turned off, such that an induced current Ib flows to the secondary side of the transformer T.

A voltage denoted by SR Sensing Voltage in FIG. 2 is a negative voltage by a conducting current of a diode D when the switch SW is turned off and has a waveform that is the same as an operation waveform of the switch SW. In addition, a signal denoted by SR GATE Pulse in FIG. 2 indicates an operation waveform of the synchronous rectifying switch SR SW. In the case in which the voltage (SR Sensing Voltage) drops to a reference voltage, that is, a set direct current (DC) voltage or less when it is changed from a "positive (+)" voltage to a "negative (−)" voltage, the synchronous rectifying switch SR SW is turned on, and in the case in which the voltage becomes the reference voltage or more when it is changed from the "negative (−)" voltage to the "positive (+)" voltage as a secondary current Ib decreases, the synchronous rectifying switch SR SW is turned off.

However, in this case, since the voltage (SR Sensing Voltage) is rapidly changed from the "negative (−)" voltage to the "positive (+)" voltage, a turn-off operation of the synchronous rectifying switch SR SW is delayed by a time required to detect the negative voltage, such that a period in which the switch of the primary side and the synchronous rectifying switch SR SW of the secondary side are simultaneously turned on is generated.

This becomes a factor decreasing efficiency and stability of a system. Therefore, a technology of performing switching so that the turn-on period of the switch SW of the primary side and the turn-on period of the synchronous rectifying switch SR SW of the secondary side are not overlapped with each other has been urgently demanded.

SUMMARY OF THE INVENTION

An object of the present invention is to provide a switching converter capable of preventing an overlap phenomenon between a switch SW of a primary side and a synchronous rectifying switch SR SW of a secondary side in a continuous mode (CCM mode) by predicting a turn-on time of the switch SW of the primary side in advance and compensating for a delay time of the synchronous rectifying switch SR SW of the secondary side, and an alternating current (AC) adaptor using the same.

According to an exemplary embodiment of the present invention, there is provided a switching converter including: a transformer T inducing primary energy to secondary side; a switch SW connected to a primary coil of the transformer T to switch a primary voltage; a synchronous rectifier SR connected to a secondary coil of the transformer T to rectify a secondary voltage; and a delay locked loop connected between the secondary coil and the synchronous rectifier SR, wherein the delay locked loop generates a signal synchronized with a turn-on control signal of the switch SW and outputs the generated signal to the synchronous rectifier SR to control a turn-off operation of the synchronous rectifier SR.

The delay locked loop may include: an edge detector detecting a rising edge in a voltage (SR Sensing Voltage) having the same waveform as that of the control signal of the switch SW to generate a signal (Rising Edge Signal); a voltage controlled oscillator outputting a signal (SR GATE Off Signal) of which a phase is adjusted according to an input voltage level to the synchronous rectifier SR; a delay compensator delaying the signal input from the voltage controlled oscillator by a predetermined time so that the voltage controlled oscillator outputs a signal synchronized with the signal (Rising Edge Signal); a phase detector receiving an output signal (Rising Edge Signal) of the edge detector and an output signal (DLL Locking Signal) of the delay compensator, comparing these two signals with each other, and generating a pulse signal corresponding to a difference therebetween; and a pulse to voltage converter converting the pulse signal input from phase detector into a specific voltage level and outputting the specific voltage level to the voltage controlled oscillator.

The pulse to voltage converter may include a charge pump and a loop filter.

The synchronous rectifier SR may include a synchronous rectifying switch SR SW turning on or off a conduction path of a current flowing to the secondary coil and a diode $D_{SR}$ having a cathode terminal and an anode terminal connected to a drain terminal and a source terminal of the synchronous rectifying switch SR SW, respectively.

An input terminal of the delay locked loop may be connected to a node N between one end of the secondary coil and the cathode terminal of the diode $D_{SR}$ through an input line, and an output terminal thereof may be connected to a gate terminal of the synchronous rectifying switch SR SW through an output line.

According to another exemplary embodiment of the present invention, there is provided an alternating current (AC) adaptor including: a bridge rectifier rectifying an input AC voltage to convert the input AC voltage into direct current (DC) power; a switching converter inducing the DC power applied to a first coil of a transformer T to a secondary coil of the transformer T through a switch SW connected to the primary coil and rectifying the induced power by a synchronous rectifier (SR) connected to a secondary coil; a feedback unit sensing a state of a voltage finally output by the switching converter and transferring information on the sensed state of the voltage to a pulse width modulation (PWM) adjuster; and the PWM adjuster outputting a control signal of which a pulse width is modulated according to a signal fed back from the feedback unit to the switch SW, wherein the switching converter includes a delay locked loop connected between the secondary coil and the synchronous rectifier SR, the delay locked loop generating a signal synchronized with a turn-on control signal of the switch SW and outputting the generated signal to the synchronous rectifier SR to control a turn-off operation of the synchronous rectifier SR.

DESCRIPTION OF THE PREFERRED EMBODIMENTS

Various advantages and features of the present invention and methods accomplishing thereof will become apparent from the following description of exemplary embodiments with reference to the accompanying drawings. However, the present invention may be modified in many different forms and it should not be limited to exemplary embodiments set forth herein. These exemplary embodiments may be provided so that this disclosure will be thorough and complete, and will fully convey the scope of the invention to those skilled in the art.

Terms used in the present specification are for explaining exemplary embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Figure 3:
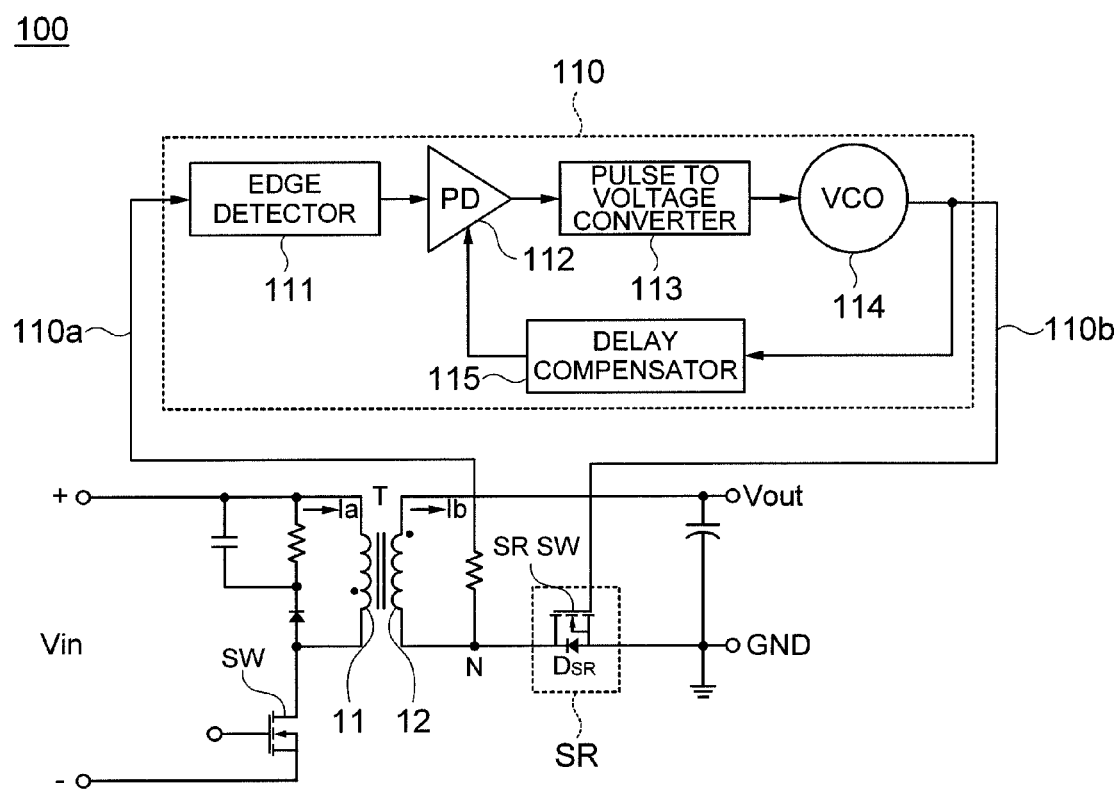
FIG. 3 is a schematic configuration diagram of a switching converter according to an exemplary embodiment of the present invention.
Figure 4:
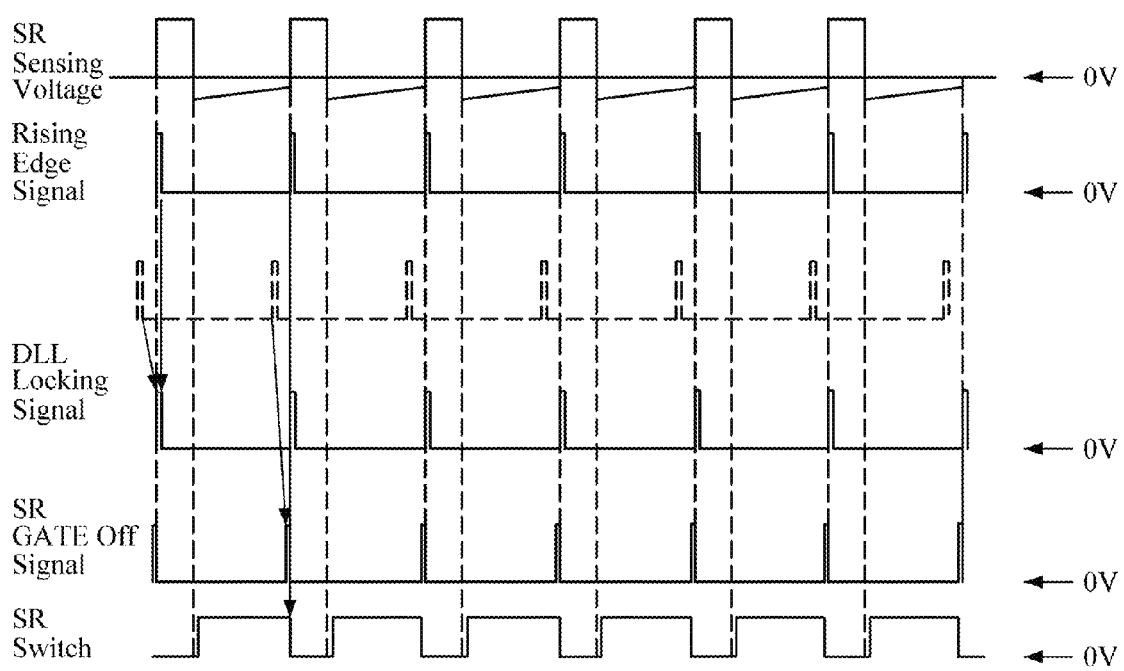
FIG. 4 is an operation waveform diagram of the switching converter according to the exemplary embodiment of the present invention.

FIG. 3 is a schematic configuration diagram of a switching converter according to an exemplary embodiment of the present invention; and FIG. 4 is an operation waveform diagram of the switching converter according to the exemplary embodiment of the present invention.

First, referring to FIG. 3, the switching converter 100 according to the exemplary embodiment of the present invention basically includes a transformer T configured of primary and secondary coils 11 and 12 having a turn ratio of N:1 therebetween, a switch SW connected to the primary coil 11 of the transformer T, and a synchronous rectifier SR connected to the secondary coil 12 of the transformer T. The switching converter 100 according to the exemplary embodiment of the present invention further includes a delay locked loop (DLL) 110 generating a signal controlling the synchronous rectifier SR using a signal input through an input line 110a connected to a node N and outputting the signal controlling the synchronous rectifier SR to the synchronous rectifier SR through an output line 110b.

The switch SW may be, for example, a metal oxide semiconductor field effect transistor (MOSFET). When an external control signal having a pulse form is applied to a gate terminal of the switch SW, the switch SW is turned on or off to convert an input voltage Vin into a signal having a pulse form.

The synchronous rectifier SR may include a synchronous rectifying switch SR SW turning on or off a conduction path of a current flowing to the secondary coil 12 and a diode $D_{SR}$ having a cathode terminal and an anode terminal connected to a drain terminal and a source terminal of the synchronous rectifying switch SR SW, respectively.

Here, the synchronous rectifying switch SR SW may be a metal oxide semiconductor field effect transistor (MOSFET), similar to the switch SW. The drain terminal of the synchronous rectifying switch SR SW is connected to one end of the secondary coil 12, the source terminal thereof is connected to a ground GND, and a gate terminal thereof is connected to an output terminal of the delay locked loop 110 through an output line 110b. Therefore, the synchronous rectifying switch SR SW receives a control signal (SR GATE Off Signal of FIG. 4) output from the delay locked loop 110 and is turned off according to the control signal.

The transistor T induces the input voltage Vin applied to the primary coil 11 at the time of a switching-on operation of the switch SW to the secondary side.

More specifically, when an external control signal having a pulse form is applied to the switch SW, the switch SW is turned on in a period in which the pulse is high. Therefore, a current Ia flowing in the primary coil 11 increased in a linear function. Then, at the time of a switching operation of the switch SW turned off in a period in which the pulse is low, the current Ia is rapidly decreased, and a polarity of the transformer T is changed, such that an induced current Ib flows in the secondary coil 12.

The induced current Ib flows only in the case in which the synchronous rectifying switch SR SW of the synchronous rectifier SR is turned on. Meanwhile, in order to perform a stable operation, the synchronous rectifying switch SR SW should be turned off before the switch SW is turned on.

The synchronous rectifying switch SR SW is turned off according to the control signal (SR GATE Off Signal) output from the delay locked loop 110, which detects a rising edge in a voltage (SR Sensing Voltage of FIG. 4) sensed through the input line 110a to generate a signal (Rising Edge Signal of FIG. 4) and output a signal (the SR GATE Off Signal) synchronized with the signal (Rising Edge Signal) to the gate terminal of the synchronous switch SR SW.

Here, since the input line 110a connected to the node N is specifically connected between the cathode terminal of the diode $D_{SR}$ and the secondary coil 12, the voltage (SR Sensing Voltage) sensed through the input line 110a is obtained by sensing a negative voltage by a conduction current of the diode $D_{SR}$ when the switch SW is turned off. As a result, the voltage (SR Sensing Voltage) has a waveform that is the same as an operation waveform of the switch SW.

Therefore, the signal (Rising Edge Signal) means a turn-on control signal of the switch SW, and the synchronous rectifying switch SR SW turned off according to the signal (SR GATE Off Signal) synchronized with the signal (Rising Edge Signal) is synchronized with the turn-on operation of the switch SW.

As described above, the switching converter 100 according to the exemplary embodiment of the present invention uses the signal synchronized with the control signal of the switch SW, more specifically, the turn-on control signal of the switch SW as the turn-off control signal of the synchronous rectifying switch SR SW, thereby making it possible to basically prevent a phenomenon that a turn-on period of the switch SW and a turn-on period of the synchronous rectifying switch are overlapped with each other.

Hereinafter, a structure and an operation of the delay locked loop 110 will be described in more detail.

Referring to FIG. 3, the delay locked loop 110 may include an edge detector 111, a voltage controlled oscillator (VCO) 114, a delay compensator 115, a phase detector (PD) 112, and a pulse to voltage converter 113.

The edge detector 111 may be a well-known edge detecting circuit and has an input terminal connected to the other end of the input line 110a of which one end is connected to the node N to output the signal (Rising Edge Signal) generated by detecting a rising edge in the voltage (SR Sensing Voltage) sensed through the sensing line 110a to the phase detector 112.

The phase detector 112 receives the signal (Rising Edge Signal) and an output signal (DLL Locking Signal of FIG. 4) of the delay compensator 115, compares these two signals with each other, and generates a pulse signal corresponding to a difference therebetween.

Here, the delay compensator 115 receives an output signal of the voltage controlled oscillator 114. In addition, the delay compensator 115 delays the received output signal of the voltage controlled oscillator 114 by a predetermined time so that the voltage controlled oscillator 114 outputs a signal synchronized with the signal (Rising Edge Signal).

The delay time by the delay compensator 115 may be considered in consideration of a time required until the negative voltage is detected, such that the synchronous rectifying switch SR SW is turned off. For example, when it is assumed that the delay time by the delay compensator 115 is tDC, a cycle of the voltage controlled oscillator 114 is tVCO, and a cycle of the signal (Rising Edge Signal) tRE, the following Equation may be satisfied.

$$tDC+tVCO=N*tRE \qquad \text{[Equation 1]}$$

Based on the above Equation 1, the phase detector 112 outputs a "down signal" or an "up signal" which of the signal (DLL Locking Signal) and the signal (Rising Edge Signal) precedes the other, thereby generating a pulse signal corresponding to the output signal and outputting the generated pulse signal to the pulse to voltage converter 113.

The pulse to voltage converter 113 including a charge pump (CP) pushing or pulling a specific amount of charges according to a width and a signal of the pulse and a loop filter accumulating the charges therein or discharging the charges therefrom according to an operation of the charge pump (CP) converts the pulse signal input from the phase detector 112 into a specific voltage level and output the specific voltage level to the voltage controlled oscillator 114. In this case, the voltage controlled oscillator 114 outputs a signal of which a phase is adjusted so as to satisfy the above Equation 1 according to the input specific voltage level, that is, the signal (SR GATE OFF Signal) synchronized with the signal (Rising Edge Signal) to the gate terminal of the synchronous rectifying switch (SR SW) through the output line 110b.

A signal denoted by SR Switch of FIG. 4 indicates an operation waveform of the synchronous rectifying switch SR SW, which is turned on in a period in which the pulse is high and is turned off in a period in which the pulse is low. That is, it may be appreciated that since the synchronous rectifying switch SR SW is turned off by the signal (SR GATE OFF Signal) synchronized with the signal (Rising Edge Signal), the turn-off operation of the synchronous rectifying switch SR SW is synchronized with the turn-on operation of the switch SW.

Therefore, in the switching converter 100 according to the exemplary embodiment of the present invention, an overlap problem that the switch SW and the synchronous rectifying switch SR SW are simultaneously turned on is not generated unlike the related art.

Hereinafter, an alternating current (AC) adaptor including the switching converter 100 according to the exemplary embodiment of the present invention will be described.

Figure 1:
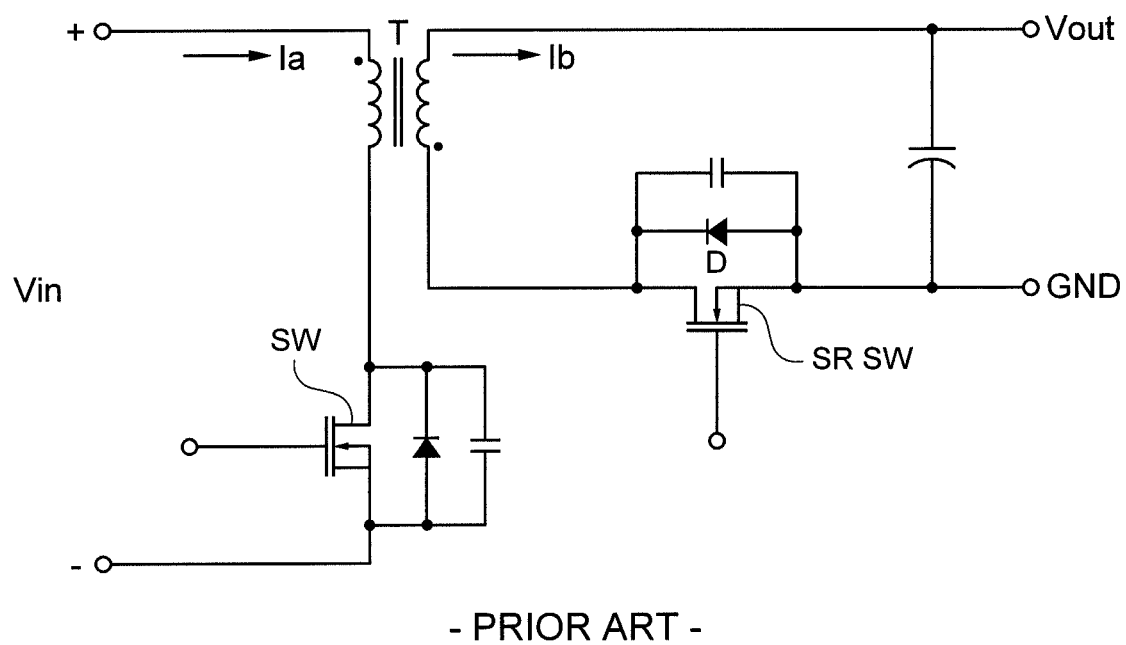
FIG. 1 is a configuration diagram of a flyback circuit using a synchronous rectifying scheme according to the related art.
Figure 2:
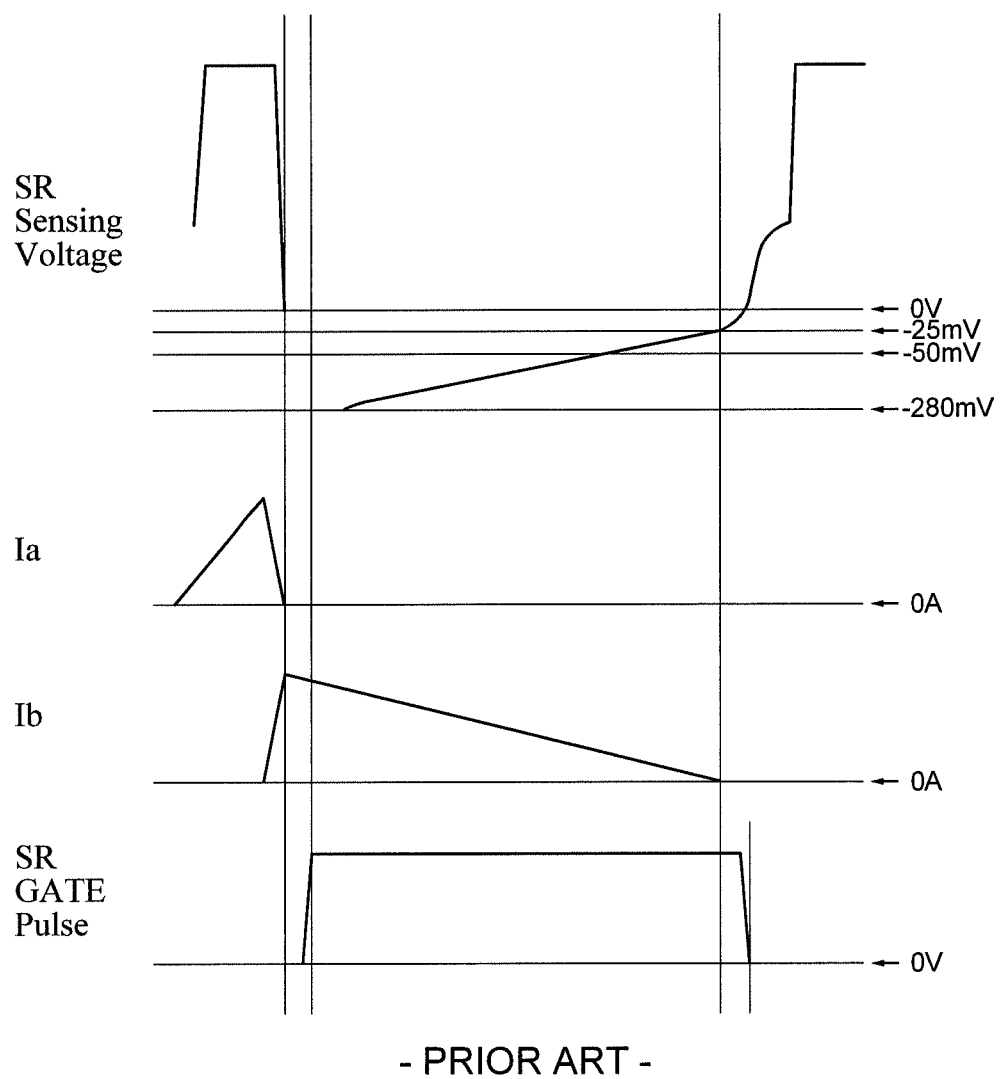
FIG. 2 is an operation waveform diagram of the flyback circuit shown in FIG. 1.
Figure 5:
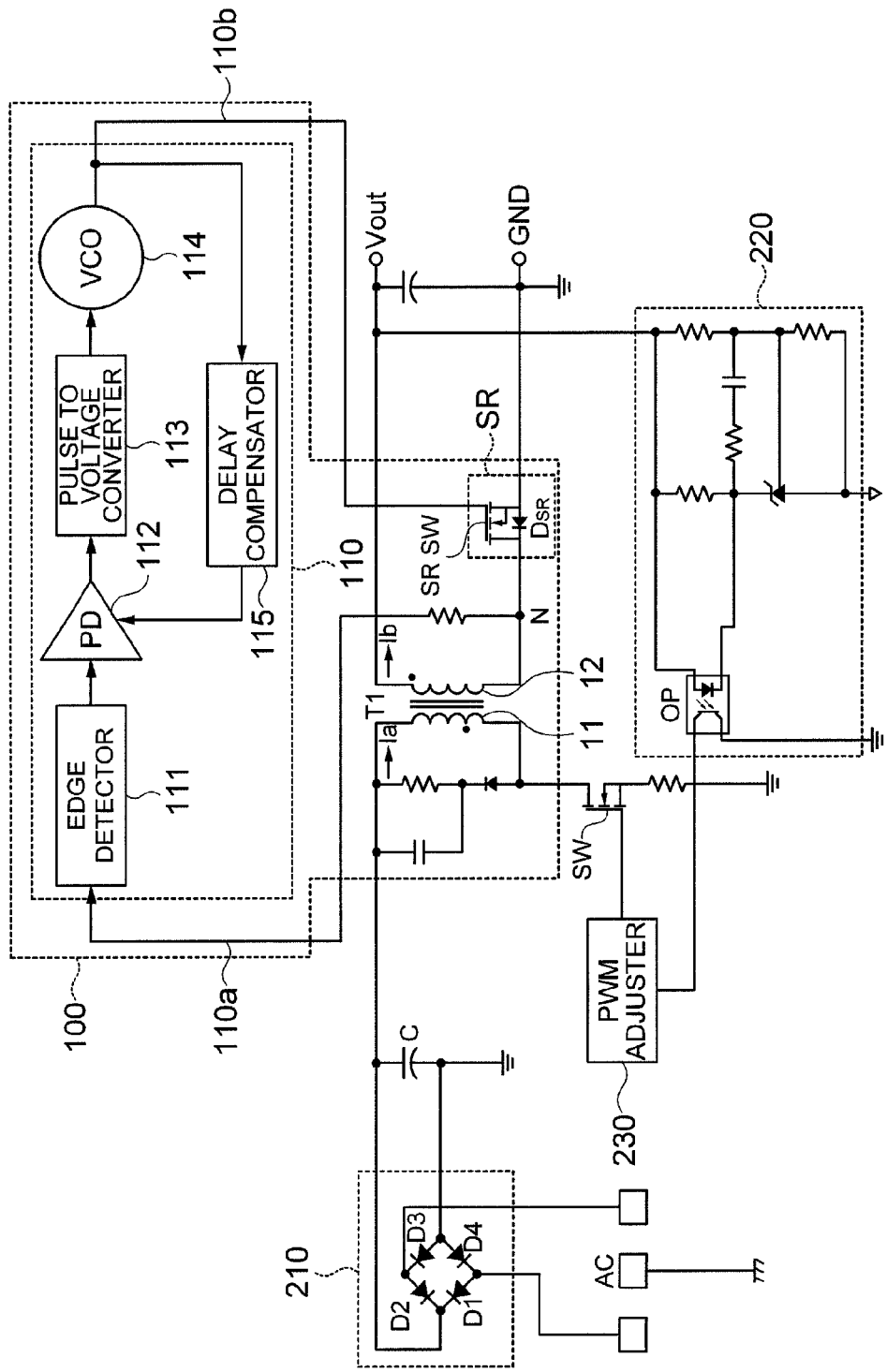
FIG. 5 is a schematic configuration diagram of an alternating current (AC) adaptor according to the exemplary embodiment of the present invention.

FIG. 5 is a schematic configuration diagram of an AC adaptor according to the exemplary embodiment of the present invention. Referring to FIG. 5, the AC adaptor 200 according to the exemplary embodiment of the present invention is configured to include a bridge rectifier 210, a switching converter 100, a feedback unit 220, and a pulse width modulation (PWM) adjuster 230. Here, since the switching converter 100 includes components that are the same as the components of FIG. 1 described above, an overlapped description will be omitted.

The bridge rectifier 210 includes four diodes connected to each other in a bridge form and rectifies AC power when the AC power is applied between a contact between a first diode D 1 and a fourth diode D4 and a contact between a second diode D2 and a third diode D3, thereby converting the AC power into direct current (DC) power.

In addition, a smoothing capacitor C connected between a contact between the first diode D1 and the second diode D2 and a contact between the third diode D3 and the fourth diode D4 smoothes a rectified pulsating current into DC power does not have a ripple.

The switch SW included in the switching converter 100 converts the DC voltage into a signal having a pulse form according to a control signal output from the PWM adjuster 230, and the transformer T induces power applied to the primary coil 11 to a secondary coil 12. An induced current Ib flowing to a secondary side by the induced power is rectified by the synchronous rectifier SR connected to the secondary coil 12 and is output to an external electronic apparatus.

The induced current Ib flows only in the case in which the synchronous rectifying switch SR SW of the synchronous rectifier SR is turned on. Meanwhile, in order to perform a stable operation, the synchronous rectifying switch SR SW should be turned off before the switch SW is turned on.

The turn-off operation of the synchronous rectifying switch SR SW is synchronized with the turn-on operation SW by the delay locked loop 110 connected to the secondary side of the switching converter 100. Since internal components of the delay looked loop 110, an operation process thereof, a connection relationship thereof in the switching converter, and the like, have been described above, a detailed description thereof will be omitted.

Meanwhile, a gate terminal of the switch SW is connected to an output terminal of the PWM adjuster 230. Therefore, the switch SW is turned on or off by receiving a control signal of which a pulse width is modulated from the PWM adjuster 230 according to a signal fed back from the feedback unit 220.

In addition, the feedback unit 220 is connected between the secondary coil 12 and an output terminal $V_{OUT}$ to sense a state of a voltage finally output by the switching converter 100 and transfers information on the sensed state of the voltage to the PWM adjuster 230 through an opto coupler OP.

According to the exemplary embodiment of the present invention, the period in which the switch SW of the primary side is turned on and the period in which the synchronous rectifying switch SR SW of the secondary side is turned on is not overlapped with each other, thereby making it possible to improve efficiency and stability of a system.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A switching converter comprising:
    a transformer T inducing primary energy to secondary side;
    a switch SW connected to a primary coil of the transformer T to switch a primary voltage;
    a synchronous rectifier SR connected to a secondary coil of the transformer T to rectify a secondary voltage; and
    a delay locked loop connected between the secondary coil and the synchronous rectifier SR,
    wherein the delay locked loop comprises an edge detector detecting a rising edge in a voltage (SR Sensing Voltage) having a same waveform as that of a control signal of the switch SW to generate a signal (Rising Edge Signal): and
    wherein the delay locked loop generates a generated signal synchronized with a turn-on control signal of the switch SW and outputs the generated signal to the synchronous rectifier SR to control a turn-off operation of the synchronous rectifier SR.

2. The switching converter according to claim 1, wherein the delay locked loop includes:
    a voltage controlled oscillator outputting a signal (SR GATE Off Signal) of which a phase is adjusted according to an input voltage level to the synchronous rectifier SR;
    a delay compensator delaying the signal input from the voltage controlled oscillator by a predetermined time so that the voltage controlled oscillator outputs a signal synchronized with the signal (Rising Edge Signal);
    a phase detector receiving an output signal (Rising Edge Signal) of the edge detector and an output signal (DLL Locking Signal) of the delay compensator, comparing these two signals with each other, and generating a pulse signal corresponding to a difference there between; and
    a pulse to voltage converter converting the pulse signal input from said phase detector into a specific voltage level and outputting the specific voltage level to the voltage controlled oscillator.

3. The switching converter according to claim 2, wherein the pulse to voltage converter includes a charge pump and a loop filter.

4. The switching converter according to claim 1, wherein the synchronous rectifier SR includes a synchronous rectifying switch SR SW turning on or off a conduction path of a current flowing to the secondary coil and a diode DSR having a cathode terminal and an anode terminal connected to a drain terminal and a source terminal of the synchronous rectifying switch SR SW, respectively.

5. The switching converter according to claim 4, wherein an input terminal of the delay locked loop is connected to a node N between one end of the secondary coil and the cathode terminal of the diode DSR through an input line, and an output terminal thereof is connected to a gate terminal of the synchronous rectifying switch SR SW through an output line.

6. An alternating current (AC) adaptor comprising:
    a bridge rectifier rectifying an input AC voltage to convert the input AC voltage into direct current (DC) power;
    a switching converter inducing the DC power applied to a first coil of a transformer T to a secondary coil of the transformer T through a switch SW connected to the primary coil and rectifying the induced power by a synchronous rectifier (SR) connected to a secondary coil;

a feedback unit sensing a state of a voltage finally output by the switching converter and transferring information on the sensed state of the voltage to a pulse width modulation (PWM) adjuster; and the PWM adjuster outputting a control signal of which a pulse width is modulated according to a signal fed back from the feedback unit to the switch SW, wherein the switching converter includes a delay locked loop comprising an edge detector detecting a rising edge in a SR Sensing Voltage having a same waveform as that of a control signal of the switch SW to generate a Rising Edge Signal and is connected between the secondary coil and the synchronous rectifier SR, the delay locked loop generating the Rising Edge Signal synchronized with the control signal of the switch SW and outputting the Rising Edge Signal to the synchronous rectifier SR to control a turn-off operation of the synchronous rectifier SR.

* * * * *